(12) United States Patent
Grubka et al.

(10) Patent No.: US 9,017,791 B2
(45) Date of Patent: Apr. 28, 2015

(54) SHINGLE BLANK HAVING FORMATION OF INDIVIDUAL HIP AND RIDGE ROOFING SHINGLES

(75) Inventors: Lawrence J. Grubka, Westerville, OH (US); Jennifer L. Frey, Monclova, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 666 days.

(21) Appl. No.: 13/039,726

(22) Filed: Mar. 3, 2011

(65) Prior Publication Data

US 2011/0151170 A1 Jun. 23, 2011

Related U.S. Application Data

(63) Continuation-in-part of application No. 12/119,937, filed on May 13, 2008, now abandoned, and a continuation-in-part of application No. 12/392,392, filed on Feb. 25, 2009, now abandoned.

(51) Int. Cl.
| | |
|---|---|
| *E04D 1/20* | (2006.01) |
| *B32B 3/26* | (2006.01) |
| *E04D 5/12* | (2006.01) |
| *E04D 1/26* | (2006.01) |
| *E04D 1/30* | (2006.01) |
| *E04D 1/00* | (2006.01) |

(52) U.S. Cl.
CPC . *E04D 1/20* (2013.01); *B32B 3/266* (2013.01); *E04D 5/12* (2013.01); *E04D 1/26* (2013.01); *E04D 1/30* (2013.01); *E04D 2001/005* (2013.01); *E04D 2001/305* (2013.01)

(58) Field of Classification Search
CPC .............. B32B 3/266; E04D 1/20; E04D 5/12
USPC ............... 52/98, 99, 100, 518, 528, 532, 547, 52/554, 315, 198, 748.1, 57; 428/136, 143
See application file for complete search history.

(56) References Cited

U.S. PATENT DOCUMENTS

| | | |
|---|---|---|
| D48,172 S | 11/1915 | DunLany |
| 1,495,070 A | 5/1924 | Finley |
| 1,516,243 A | 11/1924 | Perry |
| 1,549,723 A | 8/1925 | Mattison |
| 1,583,563 A | 5/1926 | Abraham |

(Continued)

FOREIGN PATENT DOCUMENTS

| | | |
|---|---|---|
| CA | 1207975 | 7/1986 |
| CN | 2176391 | 9/1994 |

(Continued)

OTHER PUBLICATIONS

Office action from U.S. Appl. No. 12/702,457, filed Nov. 21, 2013.

(Continued)

*Primary Examiner* — Michael Safavi
(74) *Attorney, Agent, or Firm* — Calfee, Halter & Griswold LLP

(57) ABSTRACT

A shingle blank comprises an asphalt coated mat having a cut line formed in the asphalt coated mat. The cut line includes a continuous cut portion and a perforated portion. The perforated portion is structured and configured to facilitate separation of the shingle blank into discrete portions.

29 Claims, 5 Drawing Sheets

(56) References Cited

U.S. PATENT DOCUMENTS

| | | | |
|---|---|---|---|
| 1,585,693 A * | 5/1926 | Robinson | 52/559 |
| 1,597,135 A | 8/1926 | Wittenberg | |
| 1,601,731 A | 10/1926 | Flood | |
| 1,665,222 A | 4/1928 | Robinson | |
| 1,666,429 A | 4/1928 | Stolp, Jr. | |
| 1,676,351 A * | 7/1928 | Robinson | 52/559 |
| 1,701,926 A | 2/1929 | Kirschbraun | |
| 1,799,500 A | 4/1931 | Brophy | |
| 1,802,868 A | 4/1931 | Roscoe | |
| 1,843,370 A | 2/1932 | Overbury | |
| 1,885,346 A | 11/1932 | Harsherger | |
| 1,897,139 A * | 2/1933 | Overbury | 156/93 |
| 1,898,989 A | 2/1933 | Harshberger | |
| 2,058,167 A | 10/1936 | McQuade | |
| 2,161,440 A | 6/1939 | Venrick | |
| 2,490,430 A * | 12/1949 | Greider et al. | 428/143 |
| 2,798,006 A | 7/1957 | Oldfield et al. | |
| 2,847,948 A | 8/1958 | Truitt | |
| 3,127,701 A * | 4/1964 | Jastrzemski | 52/518 |
| 3,138,897 A | 6/1964 | McCorkle | |
| 3,252,257 A | 5/1966 | Price et al. | |
| 3,332,830 A | 7/1967 | Tomlinson et al. | |
| 3,377,762 A | 4/1968 | Chalmers | |
| 3,468,086 A | 9/1969 | Warner | |
| 3,468,092 A | 9/1969 | Chalmers | |
| 3,624,975 A | 12/1971 | Morgan et al. | |
| 3,664,081 A | 5/1972 | Martin et al. | |
| 3,813,280 A * | 5/1974 | Olszyk et al. | 428/141 |
| 154,334 A | 8/1974 | Obverbury | |
| 3,913,294 A | 10/1975 | Freiborg | |
| 4,091,135 A * | 5/1978 | Tajima et al. | 428/40.3 |
| 4,194,335 A | 3/1980 | Diamond | |
| 4,195,461 A | 4/1980 | Thiis-Evensen | |
| 4,274,243 A | 6/1981 | corbin et al. | |
| 4,301,633 A * | 11/1981 | Neumann | 52/309.4 |
| 4,307,552 A * | 12/1981 | Votte | 52/309.13 |
| 4,333,279 A * | 6/1982 | Corbin et al. | 52/105 |
| 4,352,837 A * | 10/1982 | Kopenhaver | 427/187 |
| 4,366,197 A * | 12/1982 | Hanlon et al. | 428/43 |
| 4,404,783 A * | 9/1983 | Freiborg | 52/518 |
| 4,434,589 A | 3/1984 | Freiborg | |
| 4,439,955 A | 4/1984 | Freiborg | |
| 4,459,157 A | 7/1984 | Koons | |
| 4,527,374 A * | 7/1985 | Corbin | 52/557 |
| 4,580,389 A * | 4/1986 | Freiborg | 52/748.1 |
| 4,637,191 A | 1/1987 | Smith | |
| 4,672,790 A | 6/1987 | Freiborg | |
| 4,680,909 A | 7/1987 | Stewart | |
| 4,706,435 A | 11/1987 | Stewart | |
| 4,717,614 A | 1/1988 | Bondoc et al. | |
| 4,738,884 A | 4/1988 | Algrim et al. | |
| 4,755,545 A | 7/1988 | Lalwani | |
| 4,789,066 A | 12/1988 | Lisiecki | |
| D300,257 S | 3/1989 | Stahl | |
| 4,817,358 A | 4/1989 | Lincoln et al. | |
| 4,824,880 A | 4/1989 | Algrim et al. | |
| 4,835,929 A | 6/1989 | bondoc et al. | |
| 4,848,057 A | 7/1989 | MacDonald et al. | |
| 4,856,251 A | 8/1989 | Buck | |
| 4,869,942 A | 9/1989 | Jennus et al. | |
| D309,027 S | 7/1990 | Noone et al. | |
| D313,278 S | 12/1990 | Noone | |
| 5,036,119 A | 7/1991 | Berggren | |
| 5,039,755 A | 8/1991 | Chamberlain et al. | |
| 5,065,553 A | 11/1991 | Magid | |
| 5,094,042 A | 3/1992 | Freiborg | |
| 5,181,361 A | 1/1993 | Hannah et al. | |
| 5,195,290 A | 3/1993 | Hulett | |
| 5,209,802 A | 5/1993 | Hannah et al. | |
| 5,232,530 A | 8/1993 | Malmquist et al. | |
| 5,239,802 A | 8/1993 | robinson | |
| 5,247,771 A | 9/1993 | Poplin | |
| D340,294 S | 10/1993 | Hannah et al. | |
| 5,271,201 A | 12/1993 | noone et al. | |
| 5,295,340 A | 3/1994 | Collins | |
| D347,900 S | 6/1994 | Stapleton | |
| 5,319,898 A | 6/1994 | Freiborg | |
| 5,365,711 A | 11/1994 | Pressutti et al. | |
| 5,369,929 A | 12/1994 | Wqeaver et al. | |
| 5,375,387 A | 12/1994 | Davenport | |
| 5,375,388 A | 12/1994 | Poplin | |
| 5,400,558 A | 3/1995 | Hannah et al. | |
| 5,419,941 A | 5/1995 | Noone et al. | |
| 5,426,902 A | 6/1995 | Stahl et al. | |
| 5,467,568 A | 11/1995 | Sieling | |
| 5,471,801 A * | 12/1995 | Kupczyk et al. | 52/57 |
| D366,124 S | 1/1996 | Hannah et al. | |
| 5,488,807 A | 2/1996 | Terrenzio et al. | |
| D369,421 S | 4/1996 | Kiik et al. | |
| D375,563 S | 11/1996 | Hannah et al. | |
| 5,570,556 A | 11/1996 | Wagner | |
| 5,571,596 A | 11/1996 | Johnson | |
| 5,575,876 A | 11/1996 | Noone et al. | |
| 5,577,361 A | 11/1996 | Grabek, Jr. | |
| D376,660 S | 12/1996 | Hannah et al. | |
| 5,611,186 A | 3/1997 | Weaver | |
| 5,615,523 A * | 4/1997 | Wells et al. | 52/98 |
| 5,624,522 A * | 4/1997 | Belt et al. | 156/279 |
| D379,672 S | 6/1997 | Lamb et al. | |
| 5,651,734 A * | 7/1997 | Morris | 454/365 |
| 5,660,014 A | 8/1997 | Stahl et al. | |
| D383,223 S | 9/1997 | Sieling et al. | |
| 5,664,385 A | 9/1997 | Koschitzky | |
| 5,666,776 A | 9/1997 | Weaver et al. | |
| 5,676,597 A | 10/1997 | Bettoli et al. | |
| 5,711,126 A | 1/1998 | Wells | |
| 5,746,830 A | 5/1998 | Burton | |
| 5,795,389 A | 8/1998 | Koschitzky | |
| 5,799,459 A | 9/1998 | Covert | |
| D400,268 S | 10/1998 | Sieling et al. | |
| 5,822,943 A | 10/1998 | Frankoski et al. | |
| D400,981 S | 11/1998 | Bondoc et al. | |
| D403,087 S | 12/1998 | Sieling et al. | |
| 5,853,858 A | 12/1998 | Bondoc | |
| 5,860,263 A * | 1/1999 | Sieling et al. | 52/518 |
| D406,361 S | 3/1999 | Bondoc et al. | |
| 5,901,517 A | 5/1999 | Stahl et al. | |
| 5,916,103 A | 6/1999 | roberts | |
| 5,939,169 A | 8/1999 | Bondoc et al. | |
| 5,950,387 A | 9/1999 | Stahl et al. | |
| D417,016 S | 11/1999 | Moore et al. | |
| D417,513 S | 12/1999 | Blampied | |
| 6,010,589 A | 1/2000 | Stahl et al. | |
| 6,014,847 A | 1/2000 | Phillips | |
| 6,021,611 A | 2/2000 | Wells et al. | |
| 6,038,826 A | 3/2000 | Stahl et al. | |
| 6,044,608 A | 4/2000 | Stahl et al. | |
| 6,070,384 A | 6/2000 | Chich | |
| 6,083,592 A | 7/2000 | Chich | |
| 6,104,329 A | 8/2000 | Kawano | |
| 6,105,329 A | 8/2000 | Bondoc et al. | |
| RE36,858 E | 9/2000 | Pressutti et al. | |
| 6,112,492 A | 9/2000 | Wells et al. | |
| 6,125,602 A | 10/2000 | Freiborg et al. | |
| 6,145,265 A | 11/2000 | Malarkey et al. | |
| 6,148,578 A | 11/2000 | Nowacek et al. | |
| 6,156,289 A | 12/2000 | Chopra et al. | |
| 6,182,400 B1 | 2/2001 | Freiborg et al. | |
| 6,185,895 B1 | 2/2001 | Rettew | |
| 6,190,754 B1 | 2/2001 | Bondoc et al. | |
| 6,199,338 B1 | 3/2001 | Hudson, Jr. et al. | |
| 6,220,329 B1 | 4/2001 | King et al. | |
| 6,247,289 B1 * | 6/2001 | Karpinia | 52/748.1 |
| 6,253,512 B1 | 7/2001 | Thompson et al. | |
| 6,310,122 B1 | 10/2001 | Butler et al. | |
| 6,343,447 B2 | 2/2002 | Geissels et al. | |
| 6,351,913 B1 | 3/2002 | Freiborg et al. | |
| 6,355,132 B1 | 3/2002 | Becker et al. | |
| 6,361,851 B1 | 3/2002 | Sieling et al. | |
| 6,397,546 B1 | 6/2002 | Malarkey et al. | |
| 6,397,556 B1 | 6/2002 | Karpinia | |
| 6,401,425 B1 | 6/2002 | Frame | |
| 6,426,309 B1 * | 7/2002 | Miller et al. | 442/148 |
| 6,467,235 B2 | 10/2002 | Kalkanoglu et al. | |

(56) References Cited

U.S. PATENT DOCUMENTS

| | | | |
|---|---|---|---|
| 6,471,812 B1 | 10/2002 | Thompson et al. | |
| D466,629 S | 12/2002 | Phillips | |
| 6,487,828 B1 | 12/2002 | Phillips | |
| 6,494,010 B1 | 12/2002 | Miller et al. | |
| 6,510,664 B2 * | 1/2003 | Kupczyk | 52/528 |
| 6,523,316 B2 | 2/2003 | Stahl et al. | |
| 6,530,189 B2 | 3/2003 | Freshwater et al. | |
| D473,326 S | 4/2003 | Phillips | |
| 6,565,431 B1 | 5/2003 | Villela | |
| 6,578,336 B2 | 6/2003 | Elliott | |
| 6,610,147 B2 | 8/2003 | Aschenbeck | |
| 6,652,909 B2 | 11/2003 | lassiter | |
| 6,679,020 B2 | 1/2004 | Becker et al. | |
| 6,679,308 B2 | 1/2004 | Becker et al. | |
| 6,691,489 B2 | 2/2004 | Frame | |
| 6,708,456 B2 | 3/2004 | Kiik et al. | |
| 6,709,760 B2 | 3/2004 | rumbore et al. | |
| 6,709,994 B2 | 3/2004 | Miller et al. | |
| 6,725,609 B2 | 4/2004 | Freiborg et al. | |
| 6,758,019 B2 | 7/2004 | Kalkanoglu et al. | |
| 6,759,454 B2 | 7/2004 | Stephens et al. | |
| 6,790,307 B2 | 9/2004 | Elliott | |
| 6,804,919 B2 | 10/2004 | Railkar | |
| 6,813,866 B2 | 11/2004 | Naipawer, III | |
| 6,823,637 B2 | 11/2004 | Elliott et al. | |
| 6,895,724 B2 | 5/2005 | Naipawer, III | |
| 6,933,037 B2 | 8/2005 | McCumber et al. | |
| 6,936,329 B2 | 8/2005 | Kiik et al. | |
| 6,990,779 B2 | 1/2006 | Kiik et al. | |
| 7,021,468 B2 | 4/2006 | Cargile, Jr. | |
| 7,029,739 B2 * | 4/2006 | Weinstein et al. | 428/43 |
| 7,048,990 B2 | 5/2006 | Koschitzky | |
| 7,073,295 B2 | 7/2006 | Pressutti et al. | |
| 7,082,724 B2 | 8/2006 | Railkar et al. | |
| 7,118,794 B2 | 10/2006 | Kalkanoglu et al. | |
| 7,121,055 B2 | 10/2006 | Penner | |
| 7,124,548 B2 | 10/2006 | Pressutti et al. | |
| 7,146,771 B2 | 12/2006 | Swann | |
| 7,165,363 B2 | 1/2007 | Headrick et al. | |
| 7,238,408 B2 | 7/2007 | Aschenbeck et al. | |
| 7,267,862 B1 | 9/2007 | Burke et al. | |
| 7,282,536 B2 | 10/2007 | Handlin et al. | |
| 7,556,849 B2 * | 7/2009 | Thompson et al. | 428/36.9 |
| D610,720 S | 2/2010 | Elliott | |
| 7,765,763 B2 | 8/2010 | Teng et al. | |
| 7,781,046 B2 | 8/2010 | Kalkanoglu et al. | |
| 7,805,905 B2 | 10/2010 | Rodrigues et al. | |
| 7,820,237 B2 | 10/2010 | Harrington, Jr. | |
| 7,836,654 B2 | 11/2010 | Belt et al. | |
| 7,877,949 B1 | 2/2011 | Elliott | |
| 7,909,235 B2 | 3/2011 | Holley, Jr. | |
| 7,921,606 B2 | 4/2011 | Quaranta et al. | |
| 8,006,457 B2 | 8/2011 | Binkley et al. | |
| 8,127,514 B2 | 3/2012 | Binkley et al. | |
| 8,181,413 B2 | 5/2012 | Belt et al. | |
| 8,216,407 B2 | 7/2012 | Kalkanoglu et al. | |
| 8,240,102 B2 | 8/2012 | Belt et al. | |
| 8,266,861 B2 | 9/2012 | Koch et al. | |
| 8,281,520 B2 | 10/2012 | Quaranta et al. | |
| 8,281,539 B2 | 10/2012 | Kalkanoglu | |
| 8,302,358 B2 | 11/2012 | Kalkanoglu | |
| 8,316,608 B2 | 11/2012 | Binkley et al. | |
| 8,323,440 B2 | 12/2012 | Koch et al. | |
| 8,371,072 B1 * | 2/2013 | Shanes et al. | 52/43 |
| 8,371,085 B2 | 2/2013 | Koch | |
| 8,453,408 B2 | 6/2013 | Kalkanoglu | |
| 2001/0000372 A1 | 4/2001 | Kalkanoglu et al. | |
| 2001/0049002 A1 | 12/2001 | McCumber et al. | |
| 2002/0000068 A1 * | 1/2002 | Freiborg et al. | 52/57 |
| 2002/0038531 A1 | 4/2002 | Freshwater et al. | |
| 2002/0078651 A1 | 6/2002 | Freshwater et al. | |
| 2002/0114913 A1 * | 8/2002 | Weinstein et al. | 428/43 |
| 2003/0040241 A1 | 2/2003 | Kiik et al. | |
| 2003/0070579 A1 | 4/2003 | Hong et al. | |
| 2003/0093958 A1 | 5/2003 | Freiborg et al. | |
| 2003/0093963 A1 | 5/2003 | Stahl et al. | |
| 2003/0124292 A1 * | 7/2003 | Unterreiter | 428/40.1 |
| 2003/0138601 A1 | 7/2003 | Elliott | |
| 2004/0055240 A1 | 3/2004 | Kiik et al. | |
| 2004/0055241 A1 | 3/2004 | Railkar | |
| 2004/0079042 A1 | 4/2004 | Elliott | |
| 2004/0083672 A1 | 5/2004 | Penner | |
| 2004/0083673 A1 | 5/2004 | Kalkanoglu et al. | |
| 2004/0083674 A1 | 5/2004 | Kalkanoglu et al. | |
| 2004/0109971 A1 * | 6/2004 | Weinstein et al. | 428/43 |
| 2004/0111996 A1 * | 6/2004 | Heroneme | 52/518 |
| 2004/0123537 A1 | 7/2004 | Elliott et al. | |
| 2004/0123543 A1 | 7/2004 | Elliott et al. | |
| 2004/0148874 A1 | 8/2004 | Jolitz et al. | |
| 2004/0172908 A1 | 9/2004 | Swann | |
| 2004/0206012 A1 | 10/2004 | Pressutti et al. | |
| 2004/0206035 A1 | 10/2004 | Kandalgaonkar | |
| 2004/0258883 A1 | 12/2004 | Weaver | |
| 2005/0005555 A1 | 1/2005 | Naipawar | |
| 2005/0137295 A1 | 6/2005 | Kendrick et al. | |
| 2005/0193673 A1 | 9/2005 | Rodrigues et al. | |
| 2005/0204675 A1 | 9/2005 | Snyder et al. | |
| 2005/0210808 A1 | 9/2005 | Larson et al. | |
| 2005/0235599 A1 | 10/2005 | Kalkanoglu et al. | |
| 2005/0252136 A1 * | 11/2005 | Hardin | 52/518 |
| 2006/0032174 A1 | 2/2006 | Floyd | |
| 2006/0175386 A1 | 8/2006 | Holley, Jr. | |
| 2006/0179767 A1 | 8/2006 | Miller et al. | |
| 2006/0201094 A1 | 9/2006 | Lassiter | |
| 2006/0265990 A1 | 11/2006 | Kalkanoglu et al. | |
| 2007/0020436 A1 | 1/2007 | Teng et al. | |
| 2007/0039274 A1 | 2/2007 | Harrington et al. | |
| 2007/0042158 A1 | 2/2007 | Belt et al. | |
| 2007/0107372 A1 | 5/2007 | Harrington, Jr. | |
| 2007/0144077 A1 | 6/2007 | Quaranta et al. | |
| 2007/0266665 A1 | 11/2007 | Todd et al. | |
| 2008/0134612 A1 | 6/2008 | Koschitzky | |
| 2009/0038257 A1 | 2/2009 | Todd et al. | |
| 2009/0139175 A1 | 6/2009 | Todd et al. | |
| 2009/0282767 A1 | 11/2009 | Grubka | |
| 2010/0077689 A1 | 4/2010 | Kalkanoglu et al. | |
| 2010/0143667 A1 | 6/2010 | Collins et al. | |
| 2010/0192496 A1 | 8/2010 | Koch et al. | |
| 2010/0192500 A1 | 8/2010 | Koch | |
| 2010/0212240 A1 | 8/2010 | Grubka | |
| 2010/0212246 A1 | 8/2010 | Grubka | |
| 2010/0236178 A1 | 9/2010 | Loftus | |
| 2010/0239807 A1 | 9/2010 | Grubka | |
| 2010/0310825 A1 | 12/2010 | Kalkanoglu et al. | |
| 2010/0313512 A1 * | 12/2010 | Rodrigues et al. | 52/559 |
| 2011/0005158 A1 | 1/2011 | Kailey et al. | |
| 2011/0126485 A1 | 6/2011 | Bleil et al. | |
| 2011/0209428 A1 | 9/2011 | Elliott | |
| 2011/0214378 A1 | 9/2011 | Grubka | |
| 2011/0319533 A1 | 12/2011 | Gauthier et al. | |
| 2013/0177728 A1 * | 7/2013 | Grubka et al. | 428/43 |

FOREIGN PATENT DOCUMENTS

| | | |
|---|---|---|
| JP | 50-002937 | 1/1975 |
| WO | 2007/108846 | 9/2007 |
| WO | 2008/052029 | 5/2008 |
| WO | 2009/016281 | 2/2009 |
| WO | 2010/098972 | 9/2010 |
| WO | 2011/100217 | 8/2011 |

OTHER PUBLICATIONS

Office action from U.S. Appl. No. 13/019,028 dated Dec. 19, 2012.
Interview Summary from U.S. Appl. No. 12/727,459 dated Dec. 28, 2011.
Office action from U.S. Appl. No. 12/727,459 dated Jan. 19, 2012.
Interview Summary from U.S. Appl. No. 12/727,459 dated Apr. 13, 2012.
Office action from U.S. Appl. No. 12/727,459 dated May 30, 2012.
Office action from U.S. Appl. No. 12/727,459 dated Oct. 3, 2012.
Office action from U.S. Appl. No. 12/727,470 dated Aug. 10, 2012.
Office action from U.S. Appl. No. 12/831,130 dated Feb. 29, 2012.

(56) References Cited

OTHER PUBLICATIONS

Office action from U.S. Appl. No. 12/831,130 dated Jun. 14, 2012.
Office action from U.S. Appl. No. 12/831,130 dated Aug. 9, 2012.
Office action from U.S. Appl. No. 13/019,028 dated Aug. 10, 2011.
Office action from U.S. Appl. No. 13/019,028 dated Jun. 21, 2012.
Office action from Japanese Application No. 2008-525265 dated Dec. 12, 2011.
Office action from U.S. Appl. No. 13/344,025 dated Aug. 16, 2013.
Office action from U.S. Appl. No. 13/193,864, filed Nov. 4, 2013.
Office action from U.S. Appl. No. 13/193,864 dated May 15, 2013.
Office action from U.S. Appl. No. 12/727,470 dated Apr. 10, 2013.
International Search Report from PCT/US06/30633 dated Nov. 28, 2006.
International Search Report and Written Opinion from PCT/US10/23541 dated Jul. 6, 2010.
International Search Report and Written Opinion from PCT/US11/023989 dated May 26, 2011.
Office action from U.S. Appl. No. 09/515,928 dated Mar. 15, 2001.
Office action from U.S. Appl. No. 09/515,928 dated Oct. 11, 2001.
Office action from U.S. Appl. No. 09/515,928 dated Jan. 2, 2002.
Advisory action from U.S. Appl. No. 09/515,928 dated Jun. 7, 2002.
Office action from U.S. Appl. No. 09/515,928 dated Sep. 16, 2004.
Advisory action from U.S. Appl. No. 09/515,928 dated Feb. 22, 2005.
Office action from U.S. Appl. No. 09/515,928 dated Dec. 2, 2005.
Office action from U.S. Appl. No. 09/515,928 dated Apr. 25, 2006.
Office action from U.S. Appl. No. 09/515,928 dated Oct. 11, 2006.
Advisory action from U.S. Appl. No. 09/515,928 dated Jul. 19, 2007.
Office action from U.S. Appl. No. 09/515,928 dated Sep. 19, 2007.
Notice of Panel Decision from Pre-Appeal Brief Review from U.S. Appl. No. 09/515,928 dated Feb. 8, 2008.
Examiner's Answer from U.S. Appl. No. 09/515,928 dated Jun. 18, 2008.
Decision on Appeal from 09/515,928 dated Jul. 28, 2010.
Notice of Allowance from U.S. Appl. No. 09/515,928 dated Sep. 27, 2010.
Office action from U.S. Appl. No. 12/119,937 dated Apr. 14, 2010.
Office action from U.S. Appl. No. 12/119,937 dated Nov. 4, 2010.
Advisory action from U.S. Appl. No. 12/119,937 dated Jan. 19, 2011.
Office action from U.S. Appl. No. 12/119,937 dated Apr. 3, 2012.
Office action from U.S. Appl. No. 12/392,392 dated Mar. 4, 2010.
Office action from U.S. Appl. No. 12/392,392 dated Sep. 13, 2010.
Office action from U.S. Appl. No. 12/392,392 dated Dec. 22, 2010.
Interview Summary from U.S. Appl. No. 12/392,392 dated Feb. 3, 2011.
Office action from U.S. Appl. No. 12/392,392 dated Aug. 18, 2011.
Office action from U.S. Appl. No. 12/392,392 dated Nov. 21, 2011.
Advisory Action from U.S. Appl. No. 12/392,392 dated Feb. 27, 2012.
Office action from U.S. Appl. No. 12/392,392 dated Jun. 14, 2012.
Office action from U.S. Appl. No. 12/392,392 dated Jul. 19, 2012.
Office action from U.S. Appl. No. 12/702,457 dated Jun. 18, 2012.
Office action from U.S. Appl. No. 12/702,457 dated Jul. 20, 2012.
Office action from U.S. Appl. No. 12/717,519 dated Oct. 3, 2011.
Office action from U.S. Appl. No. 12/717,519 dated May 1, 2012.
Office action from U.S. Appl. No. 12/727,459 dated May 25, 2011.
Office action from U.S. Appl. No. 12/727,459 dated Aug. 30, 2011.
Advisory Action from U.S. Appl. No. 12/727,459 dated Dec. 13, 2012.
Office action from U.S. Appl. No. 13/344,025 dated Feb. 5, 2013.
Office action from Chinese application No. 200680028893 dated Mar. 27, 2009.
Office action from U.S. Appl. No. 09/515,928 dated Apr. 10, 2007.
Advisory action from U.S. Appl. No. 12/392,392 dated Dec. 22, 2010.
Office action from U.S. Appl. No. 12/727,459 dated Jul. 11, 2013.
Office action from U.S. Appl. No. 12/717,519 dated Jun. 12, 2014.
Office action from U.S. Appl. No. 13/344,025 dated Mar. 27, 2014.
Interview Summary from U.S. Appl. No. 12/702,457 dated Feb. 26, 2014.
Office action from U.S. Appl. No. 12/727,459 dated Jan. 10, 2014.
Haynes, Shellflex 3681 MSDS, Jan. 4, 1999, 5 pgs.
Office action from U.S. Appl. No. 12/702,457 dated May 7, 2014.
Office action from U.S. Appl. No. 12/727,459 dated Jun. 6, 2014.
Office action from U.S. Appl. No. 13/344,025 mailed Sep. 24, 2014.
Interview Summary from U.S. Appl. No. 12/727,459 dated Aug. 19, 2014.
Interview Summary from U.S. Appl. No. 12/702,457 dated Jul. 31, 2014.
Advisory Action from U.S. Appl. No. 12/702,457 dated Aug. 27, 2014.
Interview Summary from U.S. Appl. No. 13/344,025 dated Jul. 30, 2014.
Office action from U.S. Appl. No. 12/702,457 dated Dec. 3, 2014.
Office action from U.S. Appl. No. 12/727,459 dated Jan. 26, 2015.
Office action from U.S. Appl. No. 12/717,519 dated Dec. 12, 2014.

* cited by examiner

SHINGLE BLANK HAVING FORMATION OF INDIVIDUAL HIP AND RIDGE ROOFING SHINGLES

CROSS REFERENCE TO RELATED APPLICATIONS

This application is a continuation-in-part of co-pending U.S. patent application Ser. No. 12/119,937 filed May 13, 2008, and a continuation-in-part of co-pending U.S. patent application Ser. No. 12/392,392 filed Feb. 25, 2009, the disclosures of both are incorporated herein by reference in their entirety.

BACKGROUND

Asphalt-based roofing materials, such as roofing shingles, roll roofing and commercial roofing, are installed on the roofs of buildings to provide protection from the elements. The roofing material may be constructed of a substrate such as a glass fiber mat or an organic felt, an asphalt coating on the substrate, and a surface layer of granules embedded in the asphalt coating.

Roofing materials are applied to roofs having various surfaces formed by roofing planes. The various surfaces and roofing planes form intersections, such as for example, hips and ridges. A ridge is the uppermost horizontal intersection of two sloping roof planes. Hips are formed by the intersection of two sloping roof planes running from a ridge to the eaves.

The above notwithstanding, there remains a need in the art for improved hip and ridge roofing material and an improved method of manufacturing hip and ridge roofing material.

SUMMARY OF THE INVENTION

The present application describes various embodiments of a shingle blank from which hip and ridge shingle material is formed. In one embodiment, the shingle blank includes an asphalt coated mat having a cut line formed in the asphalt coated mat. The cut line includes a continuous cut portion and a perforated portion. The perforated portion is structured and configured to facilitate separation of the shingle blank into discrete portions.

In another embodiment, a shingle blank includes a first shingle blank layer defining a longitudinally extending prime region and a longitudinally extending headlap region. At least the prime region includes a second longitudinally extending layer bonded to the first shingle blank layer. A cut line is formed in the shingle blank and includes a continuous cut portion formed in the prime region and a perforated portion. The perforated portion is structured and configured to facilitate separation of the shingle blank into discrete portions.

In another embodiment, a method of forming a shingle blank includes forming a cut line in an asphalt coated mat to define a cut shingle blank. The cut line includes a continuous cut portion and a perforated portion. The perforated portion is structured and configured to facilitate separation of the shingle blank into discrete portions.

Other advantages of the shingle blank will become apparent to those skilled in the art from the following detailed description, when read in light of the accompanying drawings.

DETAILED DESCRIPTION

The present invention will now be described with occasional reference to the illustrated embodiments of the invention. This invention may, however, be embodied in different forms and should not be construed as limited to the embodiments set forth herein, nor in any order of preference. Rather, these embodiments are provided so that this disclosure will be more thorough, and will convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

In accordance with embodiments of the present invention, a hip and ridge shingle, and methods to manufacture the hip and ridge shingle, are provided. As used in the description of the invention and the appended claims, the term "ridge" refers to the intersection of the uppermost sloping roof planes. The term "roof plane" is defined as a plane defined by a flat portion of the roof formed by an area of roof deck. The term "hip" is defined as the intersection of sloping roof planes located below the ridge. The term "slope" is defined as the degree of incline of a roof plane. The term "granule" is defined as particles that are applied to a shingle that is installed on a roof.

Figure 1:
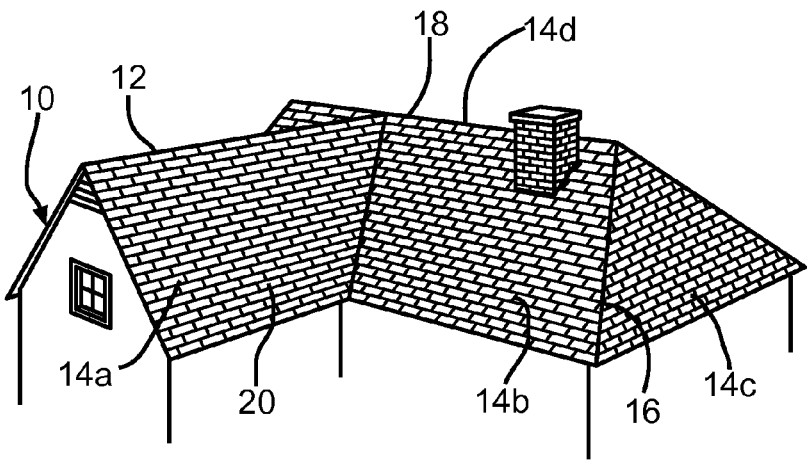
FIG. 1 is a perspective view of a building structure incorporating the hip and ridge roofing material according to the invention.

The description and figures disclose a hip and ridge roofing material for a roofing system and methods of manufacturing the hip and ridge roofing material. Referring now to FIG. 1, a building structure 10 is shown having a shingle-based roofing system 12. While the building structure 10 illustrated in FIG. 1 is a residential home, it will be understood that the building structure 10 may be any type of structure, such as a garage, church, arena, industrial or commercial building, having a shingle-based roofing system 12.

The building structure 10 has a plurality of roof planes 14a through 14d. Each of the roof planes 14a through 14d may have a slope. While the roof planes 14a through 14d shown in FIG. 1 are illustrated as having one respective illustrated slope, it will be understood that the roof planes 14a through 14d may have any suitable slope. The intersection of the roof planes 14b and 14c form a hip 16. Similarly, the intersection of the roof planes 14b and 14d form a ridge 18. The building structure 10 is covered by the roofing system 12 having a plurality of shingles 20.

Figure 2:
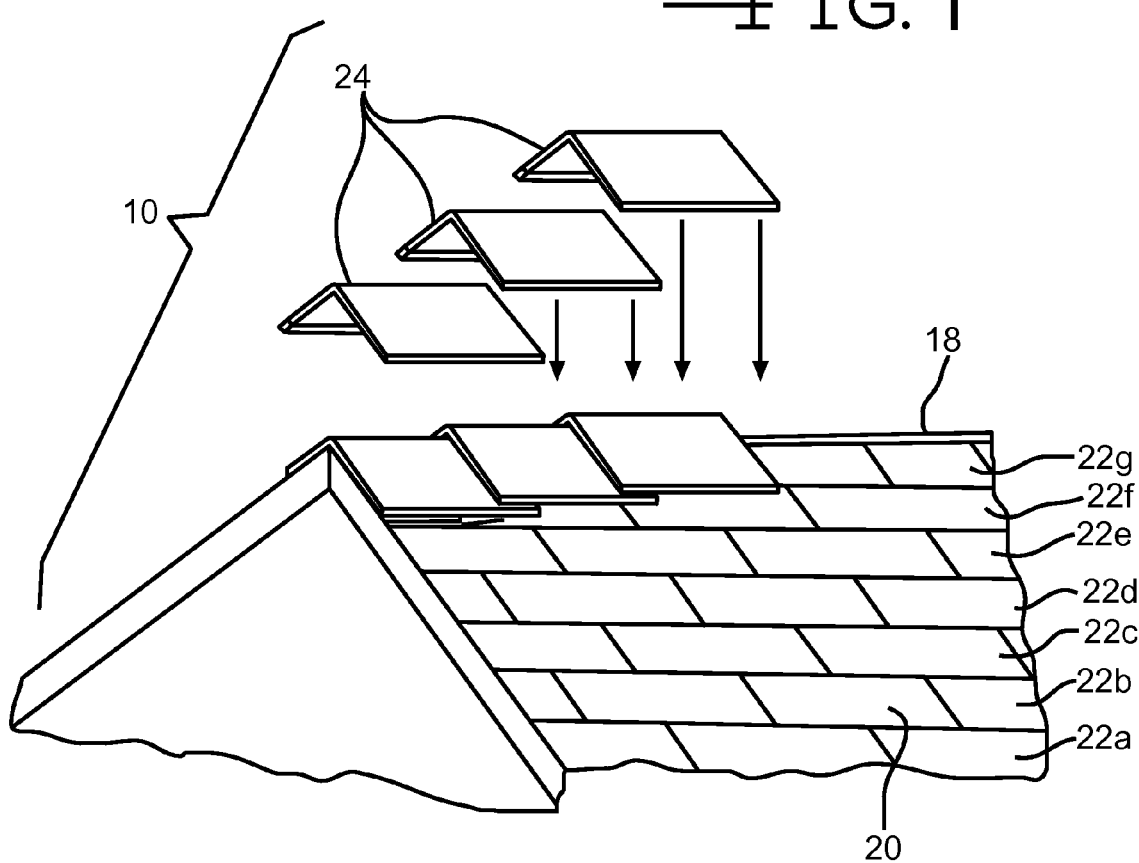
FIG. 2 is a perspective view of the installation of the hip and ridge roofing material illustrated in FIG. 1.

Referring now to FIG. 2, the shingles 20 are installed on the various roof decks in generally horizontal courses 22a through 22g in which the shingles 20 overlap the shingles 20 of a preceding course. The shingles 20 shown in FIGS. 1 and 2 may be any suitable shingle.

Hip and ridge roofing materials, also known as hip and ridge caps, cap shingles, or discrete portions when separated from the shingle blank, described below, are installed to protect hips and ridges from the elements. As shown in FIG. 2, hip and ridge roofing materials 24 are installed in an overlapping manner on the ridge 18 and over the shingles 20. In a similar fashion, hip roofing materials (not shown) are installed on a hip, such as the hip 16, and over the shingles 20. The method of installing the hip and ridge roofing materials 24 will be discussed in more detail below.

The peak or ridge 18 of the building structure 10 may include an opening covered by a ridge vent that allows air to pass out of the structure 10, but prevents insects and moisture from entering the structure 10. It will be understood that the hip and ridge roofing materials 24 described herein may be installed over a ridge vent if desired.

Figure 3:
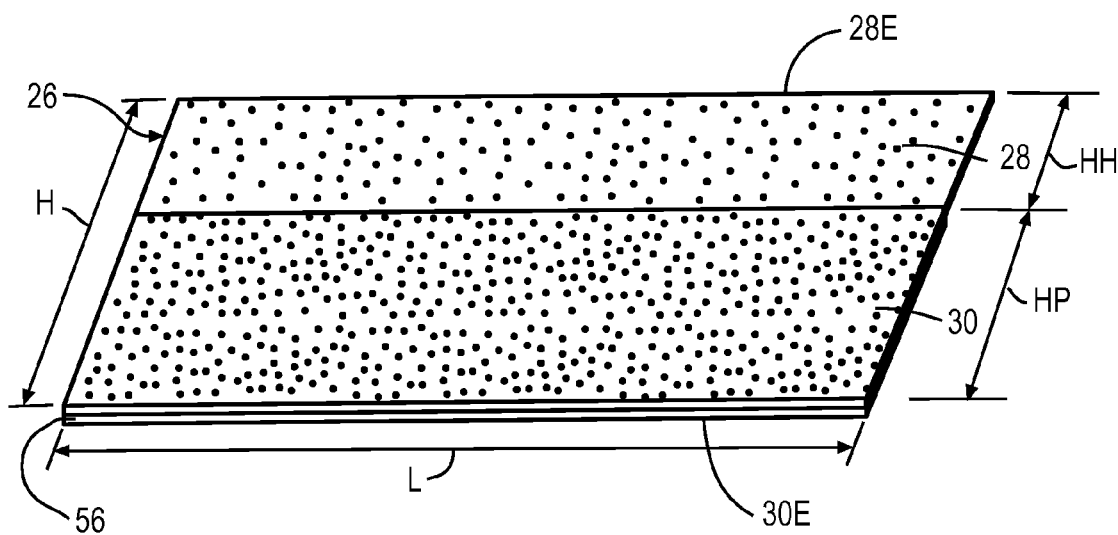
FIG. 3 is a perspective view of a first embodiment of a shingle blank used for making the hip and ridge roofing material illustrated in FIG. 2.

Hip and ridge roofing materials may be made from shingle blanks, such as shown at 26 in FIG. 3. In the illustrated embodiment, the shingle blank 26 includes a headlap region 28 and a prime region 30. The prime region 30 has a first or prime longitudinal edge 30E and the headlap region 28 has a second or headlap longitudinal edge 28E. The headlap region 28 of the shingle blank 26 is the portion of the hip and ridge roofing material that will be covered by successive overlapping hip and ridge roofing material when the hip and ridge roofing materials are installed. The prime region 30 of the shingle blank 26 is the portion of the hip and ridge roofing material that remains exposed when the hip and ridge roofing materials are installed on a roof. In other embodiments, the shingle blank may include only a prime region and no headlap region.

Referring again to FIG. 3, the shingle blank 26 may have any desired dimensions. The shingle blank 26 may also be divided between the headlap region 28 and the prime region 30 in any suitable proportion. For example, a typical residential roofing shingle blank 26 has a length L of approximately 36 inches (91.5 cm) and a height H of approximately 12 inches (30.5 cm) high, with the height H dimension being divided between the headlap region 28 and the prime region 30.

FIG. 3 illustrates one embodiment of the composition of the shingle blank 26 according to the invention. In the illustrated embodiment, the shingle blank 26 has the same composition and the same storm proof properties as the shingles disclosed in U.S. Pat. No. 6,709,994 to Miller et al. U.S. Pat. No. 6,709,994 to Miller et al. is commonly assigned and is incorporated herein by reference in its entirety. In another embodiment, the shingle blank 26 may have other suitable compositions. Alternatively, the shingle blank may be any desired shingle blank, such as the shingle blanks disclosed in U.S. patent application Ser. No. 12/702,457 filed Feb. 9, 2010 and which is a continuation-in-part of U.S. patent application Ser. No. 12/392,392 filed Feb. 25, 2009. U.S. patent application Ser. No. 12/702,457 is commonly assigned and is incorporated herein by reference in its entirety. The illustrated shingle blank 26 includes an asphalt-coated mat or substrate 44 having a layer of granules 42 to define a granule-coated mat 50. If desired, a web 56 may be bonded to a lower section 51 of the granule-coated mat 50 to provide resistance to a variety of impacts, as disclosed in U.S. Pat. No. 6,709,994.

Figure 4A:
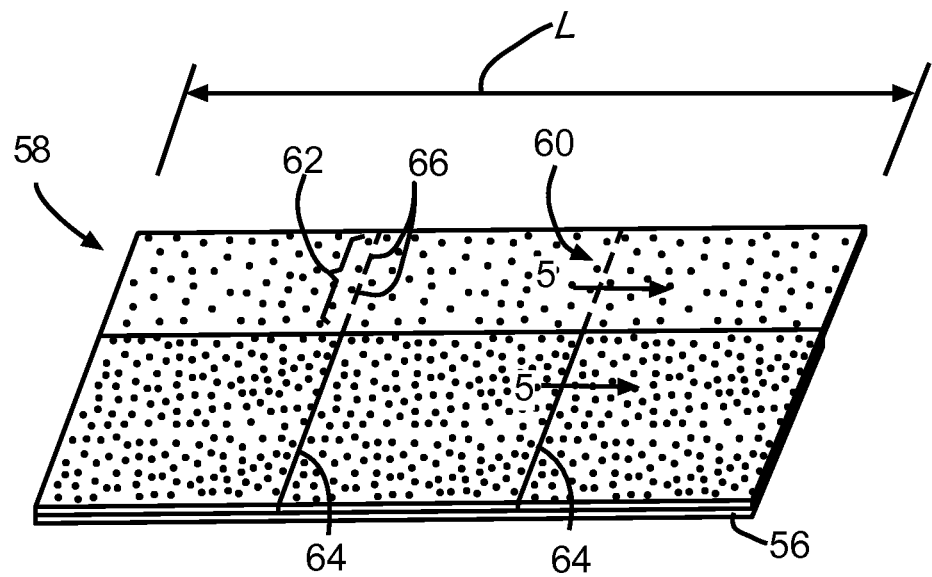
FIG. 4A is a perspective view of the shingle blank illustrated in FIG. 3 showing the formation of the individual hip and ridge roofing material illustrated in FIG. 2.
Figure 4B:
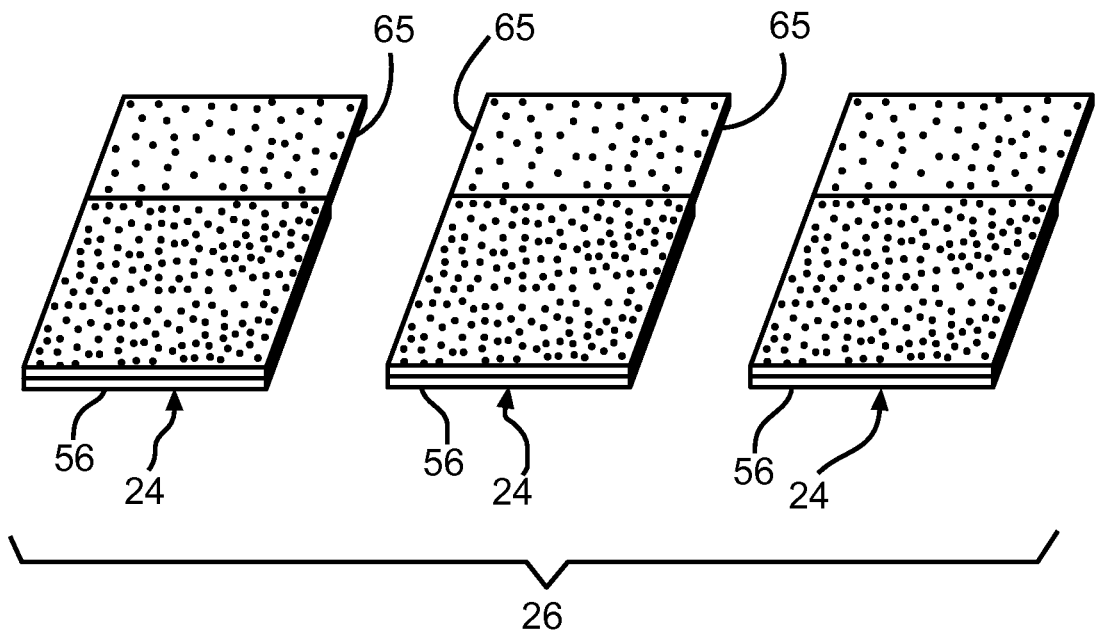
FIG. 4B is a perspective view of the individual hip and ridge roofing material illustrated in FIG. 4A.

Referring now to the embodiment shown in FIGS. 4A and 4B, a first embodiment of a cut shingle blank is illustrated at 58. The cut shingle blank 58 includes a plurality of cut lines 60. The illustrated cut lines 60 are spaced apart substantially perpendicular to the length L of the cut shingle blank 58 and extend across the headlap region 28 and the prime region 30. The cut lines 60 are positioned such that subsequent separation of the cut shingle blank 58 along the cut lines 60 forms ridge roofing material 24. The cut lines 60 include a perforated portion 62 and a continuous cut portion 64. The perforated portions 62 of the cut lines 60 include perforations 66.

Figure 5:
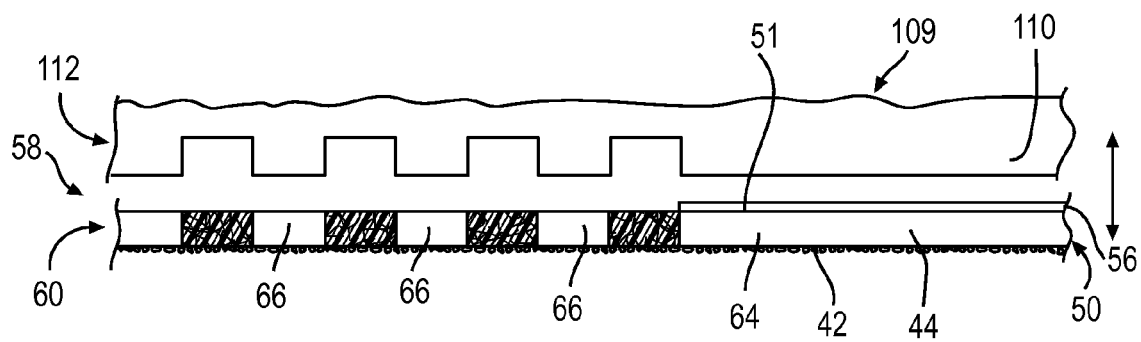
FIG. 5 is an enlarged cross-sectional view taken along the line 5-5 of FIG. 4A of a portion of a first embodiment of the cut shingle blank, and showing a portion of the knife blade.

In the embodiment illustrated in FIGS. 4A, 4B, and 5, the perforations 66 extend through the headlap region 28. The continuous cut portions 64 extend through the prime region 30 and the web 56. As used herein, the term "continuous cut" is defined as a portion of the cut line wherein the cut extends through the entire thickness of all layers of a shingle blank for the length of the continuous cut portion.

The perforations 66 may be arranged in any suitable pattern to form the perforated portion 62 of the cut line 60. In one embodiment of a perforation pattern, the perforations 66 may be about 0.25 inches long and spaced apart from edge to edge by about 0.25 inches. In another embodiment of a perforation pattern, the perforations 66 may be about 0.50 inches long and spaced apart from edge to edge about 0.50 inches. Alternatively, the perforations may be any desired length and may be spaced apart edge to edge by any desired length. The perforations 66 may be configured such that an installer is able to separate the cut shingle blanks 58 into the hip and ridge roofing material 24 at the installation site. In the illustrated embodiment, the perforated portion 62 of the cut line 60 extends the full height HH of the headlap region 28 and the continuous cut portion 64 of the cut line 60 extends the full height HP of the prime region 30. Alternatively, the perforated portion 62 and the continuous cut portion 64 may extend any length sufficient to enable an installer to separate the cut shingle blanks 58 into the ridge roofing materials 24 at an installation site. While the embodiment shown in FIG. 4A illustrates two cut lines 60, it will be understood that more or less than two cut lines 60 may be formed in the shingle blank 26.

A portion of a first embodiment of a knife blade 109, described in detail below, is shown in FIG. 5, and includes a continuous cutting portion 110 and a toothed portion 112. The knife blade 109 is structured and configured such that the continuous cutting portion 110 and the toothed portion 112 of the knife blade 109 cut completely through the single layer of the shingle blank 26 and through the web 56.

In each of the embodiments illustrated in FIGS. 5 through 9, a knife blade is illustrated in a position spaced apart from the cut shingle blank, and the cut shingle blank is shown after it has been cut by the knife blade. Further, the shingle blanks are shown being cut from a lower surface (opposite the granule-coated surface) toward the granule-coated surface of each shingle blank. It will be understood that the shingle blanks may also be cut from the granule-coated surface toward the lower surface of each shingle blank.

Figure 10:
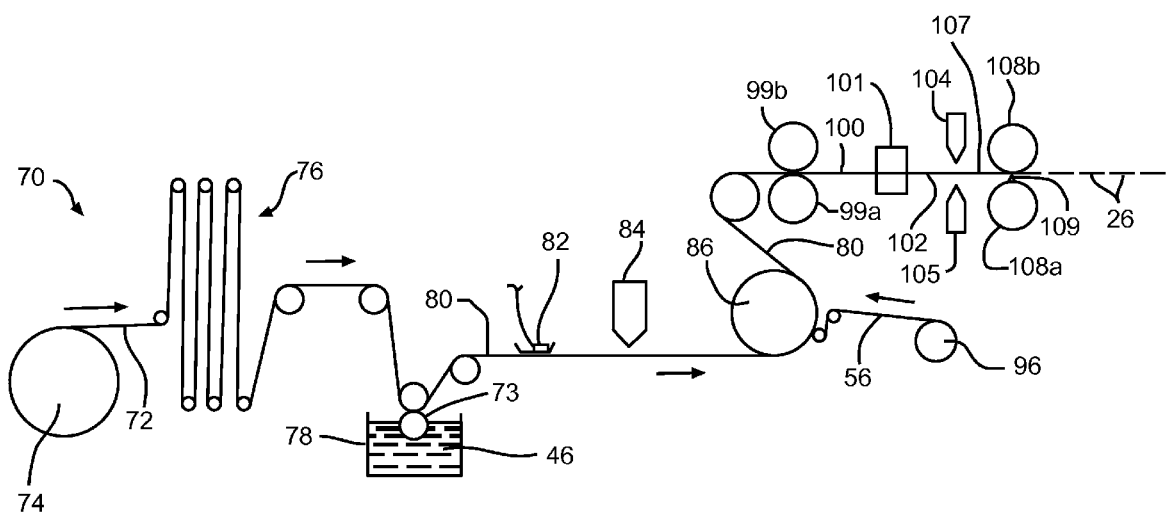
FIG. 10 is a schematic view in elevation of apparatus for manufacturing an asphalt-based roofing material according to the invention.

One embodiment of the process and apparatus to manufacture the shingle blank 26 is described in U.S. Pat. No. 6,709,994 to Miller et al., and is only summarized herein. Referring now to FIG. 10, there is shown an apparatus 70 for manufacturing perforated shingle blanks according to the invention. The illustrated manufacturing process involves passing a continuous sheet 72 in a machine direction (indicated by the arrows) through a series of manufacturing operations. In one embodiment, the sheet 72 typically moves at a speed of at least about 200 feet/minute (61 meters/minute) or 300 feet/minute (91 meters/minute), and in another embodiment, typically at a speed within the range of between about 450 feet/minute (137 meters/minute) and about 800 feet/minute (244 meters/minute). Although the invention is shown and described in terms of a continuous process, it will be understood that the invention may also be practiced in a batch process using discreet lengths of materials instead of continuous sheets.

In a first step of the manufacturing process, the continuous sheet 72 of substrate is payed out from a roll 74. The substrate may be any type known for use in reinforcing asphalt-based roofing materials, such as a nonwoven web, scrim, or felt of fibrous materials, such as glass fibers, mineral fibers, cellulose fibers, rag fibers, mixtures of mineral and synthetic fibers, or the like. Combinations of materials may also be used in the substrate. The sheet 72 of substrate is passed from the roll 74 through an accumulator 76. The accumulator 76 allows time for splicing one roll of substrate to another, during which time the substrate within the accumulator 76 is fed to the manufacturing process so that the splicing does not interrupt manufacturing.

Next, the sheet 72 is passed through a coater 78 where an asphalt coating 46 is applied to the sheet 72 to completely cover the sheet 72 with a tacky coating. The asphalt coating 46 may be applied in any suitable manner. In the illustrated embodiment, the sheet 72 contacts a roller 73, that is in contact with a supply of hot, melted asphalt. The roller 73 completely covers the sheet 72 with a tacky coating of hot, melted asphalt to define an asphalt coated sheet 80. In other embodiments, however, the asphalt coating could be sprayed on, rolled on, or applied to the sheet 72 by other means.

As used herein, the term "asphalt coating" is defined as any type of bituminous material suitable for use on a roofing material such as asphalts, tars, pitches, or mixtures thereof. The asphalt may be either manufactured asphalt produced by refining petroleum or naturally occurring asphalt. The asphalt coating 46 may include various additives and/or modifiers, such as inorganic filters, mineral stabilizers, or organic materials, such as polymers, recycled streams, or ground tire rubber.

As further shown in FIG. 10, the asphalt-coated sheet 80 may be passed beneath an applicator 82, where the optional protective coating, such as described in U.S. Pat. No. 6,709,994 to Miller et al., may be applied to portions of the upper surface of the upper section of the asphalt coating 46. The protective coating may be applied to the upper surface of the upper section of the asphalt coating 46 by any suitable method) such as for example by application as a film. The asphalt-coated sheet 80 is then passed beneath a granule dispenser 84 for the application of granules 42. While the embodiment shown in FIG. 10 illustrates a single granule dispenser 84, it will be appreciated than any number of granule dispensers 84 may be used. After deposit of the granules 42, the asphalt-coated sheet 80 is turned around a slate drum 86 to press the granules 42 into the asphalt coating 46 and to temporarily invert the asphalt-coated sheet 80.

Referring again to FIG. 10, the roofing material; i.e., the shingle blank 26, may also include the web 56. It will be understood however, that the web 56 is not required. The web 56 is selected for the type of roofing material and is positioned and bonded in such a manner as to provide the roofing material with improved impact resistance to a variety of impacts. As shown in FIG. 10, the web 56 may be payed out from a roll 96 onto the lower surface of the asphalt-coated sheet 80 while the asphalt-coated sheet 80 is inverted on the slate drum 86. As the asphalt-coated sheet 80 turns around the slate drum 86, the asphalt coating 46 is still hot, soft, and tacky, so that the web 56 adheres to the lower surface of the asphalt coating 46 and is pulled around the slate drum 86 along with the asphalt-coated sheet 80. The web 56 may be applied to the lower surface of the asphalt-coated sheet 80 in the prime portions 30, but not in the headlap portions 28. Application of the web 56 beneath just the prime portion 30 of a roofing material provides improved impact resistance to the portion of the roofing material exposed to the elements on a roof, while minimizing the overall cost of the roofing material. While the embodiment shown in FIG. 10 illustrates one method of applying a web to the roofing material, it will be understood that other suitable bonding methods, such as for example heat sealing, ultrasonic welding, pressure sensitive or hot melt adhesive, electrostatic bonding, and physical intertwining by such means as needling or stitching, may be used. Bonding the web 56 to the asphalt-coated sheet 80 forms webbed sheet (not shown). In an embodiment wherein a web 56 is bonded to the asphalt-coated sheet 80 to form a webbed sheet, the webbed sheet may be pressed and cut as described below regarding the asphalt-coated sheet 80.

In the illustrated embodiment, the asphalt-coated sheet 80 is passed between backing roller 99a and press roller 99b. The rollers, 99a and 99b, are configured to compress the asphalt-coated sheet 80 with sufficient pressure to embed the granules 42 into the asphalt-coated sheet 80. Passing the asphalt-coated sheet 80 through the backing roller 99a and the press roller 99b forms the embedded sheet 100.

Referring again to FIG. 10, after the embedded sheet 100 is formed by the backing roller 99a and the press roller 99b; the embedded sheet 100 is cooled by any suitable cooling apparatus 101, or allowed to cool at ambient temperature to form a cooled sheet 102.

If desired, the cooled sheet 102 may be passed through applicators 104 and 105. The applicators 104 and 105 are configured to apply a sealant to the surfaces of the cooled sheet 102. The applicators 104 and 105 may be any suitable mechanism or device for applying the sealant to the cooled sheet 102. In the illustrated embodiment, the applicator 104 applies the sealant to the top surface of the cooled sheet 102 and the applicator 105 applies the sealant to the bottom surface of the cooled sheet 102. In other embodiments, the sealant may be applied to just the top or bottom surfaces of the cooled sheet 102. Application of the sealant to the cooled sheet 102 forms sealed sheet 107.

The sealed sheet 107 is then passed through cutting roller 108a and anvil roller 108b. In the illustrated embodiment the rollers, 108a and 108b, are configured to perform several manufacturing operations. The cutting roller 108a and the anvil roller 108b are configured to form the cut lines 60. As discussed above, the cut lines 60 may be positioned anywhere along the length L of the shingle blank 26. The cutting roller 108a includes a plurality of knife blades 109 spaced apart and extending radially outwardly from a surface of the cutting roller 108a. The knife blades 109 rotate with the rotation of the cutting roller 108a and form the continuous cut portion 64 and the perforated portion 62 of the cut lines 60 upon contact with the sealed sheet 107. The cutting roller 108a and the anvil roller 108b may also be configured to cut the sealed sheet 107 to form individual cut shingle blanks 58 and/or individual shingle blanks 26.

While FIG. 10 illustrates one example of an apparatus configured for forming the cut line 60, it will be understood that other suitable apparatus or combinations of apparatus may be used.

The cut shingle blanks 26 may be collected and packaged. While the embodiment shown in FIG. 10 illustrates forming the cut line 60 and cutting the sealed sheet 107 into individual cut shingle blanks 58 as a single process, it is within the contemplation of this invention that the step of forming the cut line 60 and the step of cutting the sealed sheet 107 into individual cut shingle blanks 58 may be completed at different times and by different apparatus.

Referring again to FIGS. 4A and 4B, the cut shingle blanks 58 arrive at an installation site having the cut lines 60 formed therein. During installation, the roofing installer cuts or tears the cut shingle blank 58 along the perforated portions 62 of the cut lines 60 to form hip and ridge roofing material 24. The perforations 66 allow for hip and ridge roofing material 24 to be formed from the cut shingle blanks 58 as the perforations 66 allow the headlap region 28 to be easily cut or torn.

The formed hip and ridge roofing material 24 has perforated edges 65. The configuration of the perforations 66 result in a perforated edge 65 which in some embodiments may be somewhat ragged. For example, if the individual perforations 66 have a relatively long length or if a larger number of perforations 66 are formed, then the perforated edges 65 may be relatively smoother. Conversely, if the individual perforations 66 have a relatively shorter length or if a fewer number of perforations 66 are formed, the perforated edges 65 may then be relatively more ragged.

Figure 6:
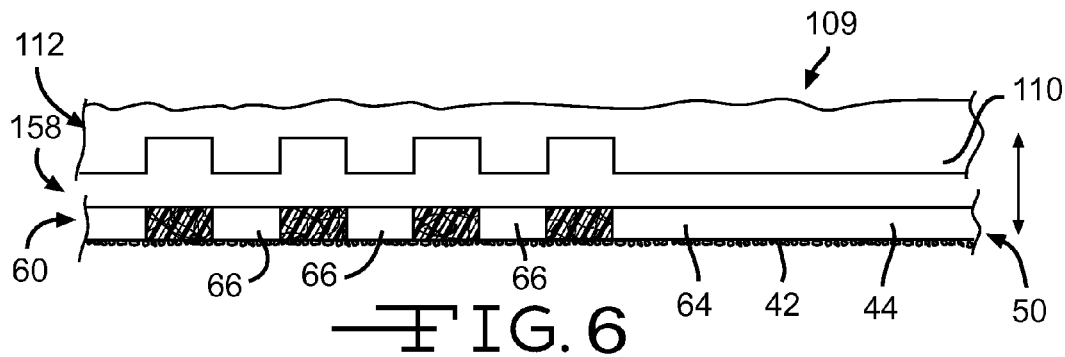
FIG. 6 is an enlarged cross-sectional view of a portion of a second embodiment of the cut shingle blank and a portion of the associated knife blade.

In other embodiments, the perforations 66 of the perforated portion 62, and the continuous cut portion 64 may extend through any desired number of layers of a shingle blank. For example, as shown in FIG. 6, a second embodiment of the cut shingle blank 158 may include one layer of the shingle blank 26, but without the web 56. The cut shingle blank 158 is otherwise identical to the cut shingle blank 58, and like reference numbers are used to indicate corresponding parts.

Figure 7:
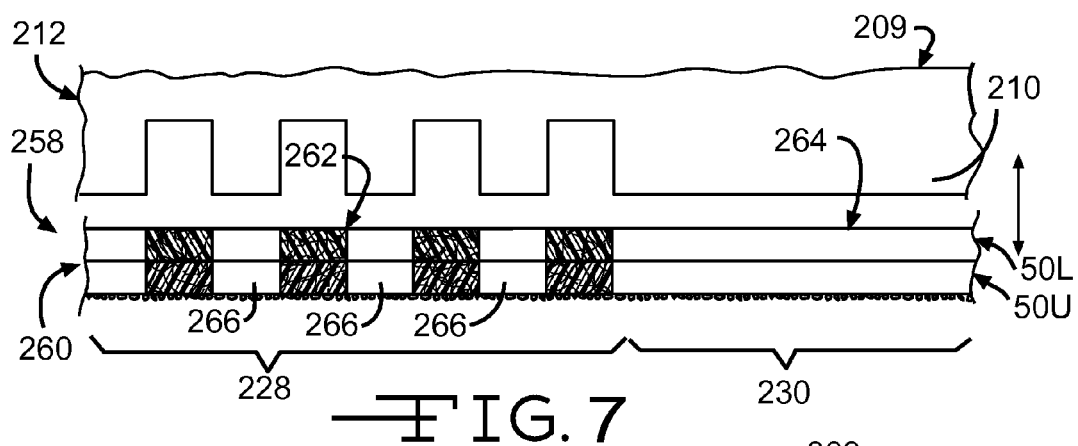
FIG. 7 is an enlarged cross-sectional view of a portion of a third embodiment of the cut shingle blank and a portion of the associated knife blade.

Referring now to FIG. 7, a portion of a third embodiment of the cut shingle blank is shown generally at 258. The cut shingle blank 258 includes at least portions of two granule-coated mats bonded together. In the illustrated embodiment, the cut shingle blank 258 includes a first longitudinally extending shingle blank layer or lower granule coated mat 50L and a second longitudinally extending layer or granule coated mat 50U. The cut shingle blank 258 also includes a plurality of cut lines 260, one of which is shown in section in FIG. 7. The illustrated cut line 260 extends from the headlap longitudinal edge (not shown in FIG. 7), across the headlap region 228 and the prime region 230, to the prime longitudinal edge (not shown in FIG. 7).

The cut line 260 includes a perforated portion 262 and a continuous cut portion 264. The perforated portion 262 of the cut line 260 includes perforations 266.

In the embodiment illustrated in FIG. 7, the perforations 266 extend through both layers of the granule-coated mats 50L and 50U in the headlap region 228. The continuous cut portion 264 also extends through both layers of the granule-coated mats 50L and 50U in the prime region 230.

A portion of a second embodiment of a knife blade 209 is shown in FIG. 7 and includes a continuous cutting portion 210 and a toothed portion 212. The knife blade 209 is structured and configured such that the continuous cutting portion 210 and the toothed portion 212 of the knife blade 209 cut completely through both layers of the granule-coated mats 50L and 50U.

Figure 8:
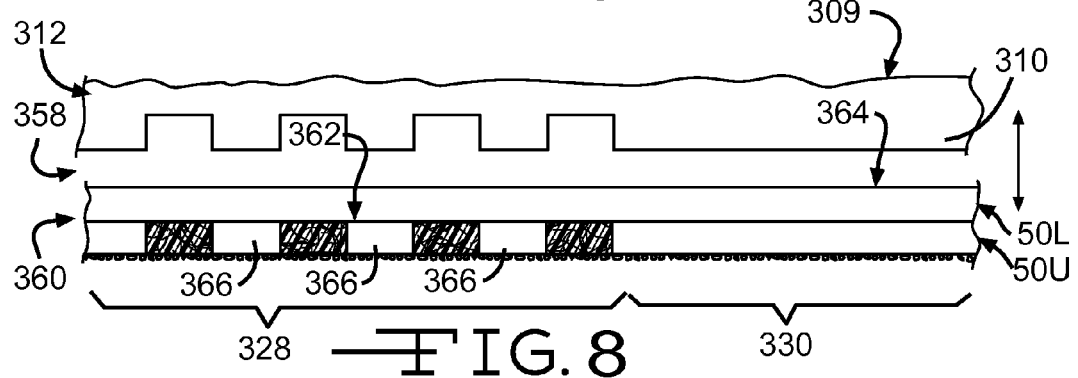
FIG. 8 is an enlarged cross-sectional view of a portion of a fourth embodiment of the cut shingle blank and a portion of the associated knife blade.

Referring now to FIG. 8, a portion of a fourth embodiment of the cut shingle blank is shown generally at 358. The cut shingle blank 358 includes at least portions of two granule-coated mats 50L and 50U bonded together. The cut shingle blank 358 also includes a plurality of cut lines 360, one of which is shown in section in FIG. 8. The illustrated cut line 360 extends from the headlap longitudinal edge (not shown in FIG. 8), across the headlap region 328 and the prime region 330, to the prime longitudinal edge (not shown in FIG. 8). The cut line 360 includes a perforated portion 362 and a continuous cut portion 364. The perforated portion 362 of the cut line 360 includes perforations 366.

In the embodiment illustrated in FIG. 8, a portion of a third embodiment of the knife blade is shown at 309 and includes a continuous cutting portion 310 and a toothed portion 312. The knife blade 309 is structured and configured such that the continuous cutting portion 310 cuts completely through both layers of the granule-coated mats 50L and 50U to define the continuous cut portion 364. The knife blade 309 is further structured and configured such that the toothed portion 312 forms a continuous cut through the first or lower granule-coated mat 50L and forms perforations 366 through the second or upper granule-coated mat 50U.

Advantageously, because the lower granule-coated mat 50L is cut through its entire thickness, and only the upper granule-coated mat 50U has perforations, the cut shingle blank 358 is easier to tear than a similar two or more layer laminated shingle blank having perforations through the two or more layers.

Figure 9:
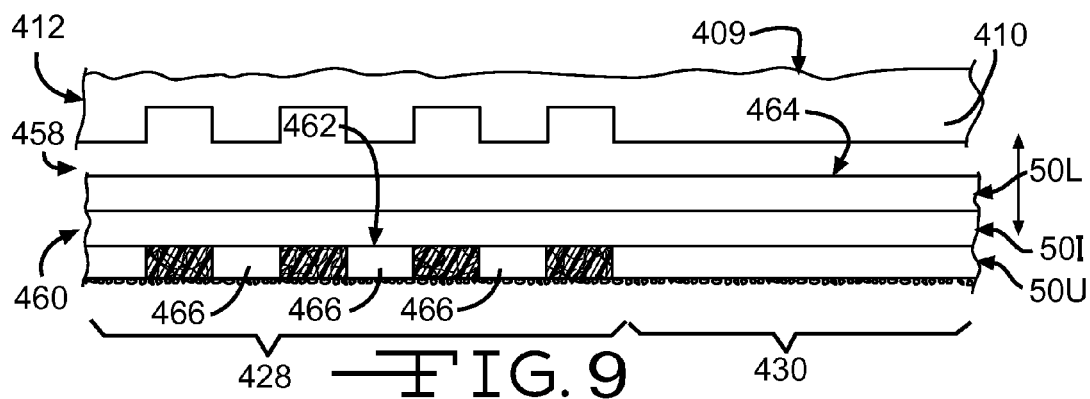
FIG. 9 is an enlarged cross-sectional view of a portion of a fifth embodiment of the cut shingle blank and a portion of the associated knife blade.

Referring now to FIG. 9, a portion of a fifth embodiment of the cut shingle blank is shown generally at 458. The cut shingle blank 458 includes at least portions of three granule-coated mats 50L, 50I, and 50U bonded together. The cut shingle blank 458 also includes a plurality of cut lines 460, one of which is shown in section in FIG. 9. The illustrated cut line 360 extends from the headlap longitudinal edge (not shown in FIG. 9), across the headlap region 428 and the prime region 430, to the prime longitudinal edge (not shown in FIG. 9). The cut line 460 includes a perforated portion 462 and a continuous cut portion 464. The perforated portion 462 of the cut line 460 includes perforations 466.

In the embodiment illustrated in FIG. 9, a portion of a fourth embodiment of the knife blade is shown at 409 and includes a continuous cutting portion 410 and a toothed portion 412. The knife blade 409 is structured and configured such that the continuous cutting portion 410 cuts completely through all layers (three layers 50L, 50I, and 50U are illustrated in FIG. 9) of the granule-coated mats 50L, 50I, and 50U to define the continuous cut portion 464. The knife blade 409 is further structured and configured such that the toothed portion 412 forms a continuous cut through the first or lower granule-coated mat 50L and an intermediate granule-coated mate 50I, and forms perforations 366 through only the third or upper granule-coated mat 50U.

Advantageously, because the lower and intermediate granule-coated mats 50L and 50I are cut through their entire thicknesses, and only the upper granule-coated mat 50U has perforations, the cut shingle blank 458 is easier to tear than a similar three or more layer laminated shingle blank having perforations through three or more layers.

The present invention should not be considered limited to the specific examples described herein, but rather will be understood to cover all aspects of the invention. Various modifications, equivalent processes, as well as numerous structures and devices to which the present invention may be applicable will be readily apparent to those of skill in the art. Those skilled in the art will understand that various changes may be made without departing from the scope of the invention, which is not to be considered limited to what is described in the specification.

What is claimed is:

1. A shingle blank comprising an asphalt coated mat having a cut line formed in the asphalt coated mat;
    wherein the cut line includes a continuous cut portion and a perforated portion; and wherein the perforated portion is structured and configured to facilitate separation of the shingle blank into discrete portions, and wherein the continuous cut portion forms adjacent cut edges on the shingle blank along the continuous cut portion, the edges being in contact prior to separation of the shingle blank into discrete portions.

2. The shingle blank according to claim 1, wherein the shingle blank has a length and a width, and wherein the cut line extends substantially across the width of the shingle blank.

3. The shingle blank according to claim 2, wherein the cut line extends substantially across the width of the shingle blank between a first longitudinal edge and a second longitudinal edge in a direction substantially perpendicular to the length of the shingle blank.

4. The shingle blank according to claim 1, wherein the continuous cut portion defines a continuous cut extending through a thickness of the asphalt coated mat.

5. The shingle blank according to claim 1, wherein the asphalt coated mat is configured to include a longitudinally extending prime region and a longitudinally extending headlap region.

6. The shingle blank according to claim 5, wherein the continuous cut portion of the cut line is formed in the prime region and the perforated portion of the cut line is formed in the headlap region.

7. A shingle blank comprising a first shingle blank layer defining a longitudinally extending prime region and a longitudinally extending headlap region;
    wherein at least the prime region includes a second longitudinally extending layer bonded to the first shingle blank layer;
    wherein a cut line is formed in the shingle blank; and
    wherein the cut line includes a continuous cut portion formed in the prime region and a perforated portion formed in the headlap region,
    wherein the perforated portion is structured and configured to facilitate separation of the shingle blank into discrete portions, each of the discrete portions has a headlap region and a prime region with substantially the same length.

8. The shingle blank according to claim 7, wherein the first shingle blank layer is an asphalt coated mat.

9. The shingle blank according to claim 8, wherein the second longitudinally extending layer is an asphalt coated mat.

10. The shingle blank according to claim 7, wherein the shingle blank has a length and a width, and wherein the cut line extends substantially across the width of the shingle blank.

11. The shingle blank according to claim 7, wherein the cut line extends substantially across the width of the shingle blank between a first longitudinal edge and a second longitudinal edge in a direction substantially perpendicular to the length of the shingle blank.

12. The shingle blank according to claim 7, wherein the continuous cut portion defines a continuous cut extending through a thickness of the shingle blank.

13. A method of forming a shingle blank comprising forming a cut line in an asphalt coated mat to define a cut shingle blank;
    wherein the cut line includes a continuous cut portion and a perforated portion; and wherein the perforated portion is structured and configured to facilitate separation of the shingle blank into discrete portions, and wherein the continuous cut portion forms adjacent cut edges on the shingle blank along the continuous cut portion, the edges being in contact prior to separation of the shingle blank into discrete portions.

14. The method according to claim 13, further including separating the cut shingle blank along the cut line into discrete portions.

15. The method according to claim 13, wherein the shingle blank has a length and a width, and wherein the cut line extends substantially across the width of the shingle blank.

16. The method according to claim 15, wherein the cut line extends substantially across the width of the shingle blank between a first longitudinal edge and a second longitudinal edge in a direction substantially perpendicular to the length of the shingle blank.

17. The method according to claim 13, wherein the continuous cut portion defines a continuous cut extending through a thickness of the asphalt coated mat.

18. The method according to claim 13, wherein the asphalt coated mat is configured to include a longitudinally extending prime region and a longitudinally extending headlap region.

19. The method according to claim 18, wherein the continuous cut portion of the cut line is formed in the prime region and the perforated portion of the cut line is formed in the headlap region.

20. A shingle blank comprising:
    a sheet including a substrate coated with an asphalt coating, the sheet configured to include a prime region and a headlap region;
    a web limited to the prime region;
    at least one perforation line positioned in the headlap region and having a plurality of perforations; and
    at least one continuous cut line extending substantially across the prime region, the at least one continuous cut line being configured to extend through the substrate, the asphalt coating, and the web;
    wherein the at least one perforation line and the at least one continuous cut line are sufficient to facilitate separation of the shingle blank to form a plurality of hip and ridge shingles each having a prime region and a headlap region having substantially the same length.

21. The shingle blank of claim 20 in which the shingle blank has a length and wherein the at least one perforation line extends substantially across the headlap region in a direction substantially perpendicular to the length of the shingle blank.

22. The shingle blank of claim 20 in which the perforations have a length of about 0.25 inches.

23. The shingle blank of claim 20 in which the perforations are spaced apart a distance of about 0.25 inches from edge to edge.

24. The shingle blank of claim 20 in which the web has a depth of approximately 0.03125 inches.

25. A shingle blank comprising:
  a sheet including a substrate coated with an asphalt coating, the sheet configured to include a prime region and a headlap region, the asphalt coating including an upper section and a lower section, the upper section being positioned above the substrate, the lower section being positioned below the substrate;
  a web limited to a lower section of the prime region; and
  at least one continuous cut line and at least one perforation line positioned in the shingle blank, the continuous cut line configured to extend through the substrate, the upper and lower sections of the asphalt coating and the web;
  wherein the at least one perforation line has a plurality of perforations sufficient to facilitate separation of the shingle blank to form a plurality of hip and ridge shingles, and wherein the continuous cut line forms adjacent cut edges on the shingle blank along the continuous cut portion, the edges being in contact prior to separation of the shingle blank.

26. The shingle blank of claim 25 in which the shingle blank has a length and wherein the at least one perforation line and the at least one continuous cut line combine to extend substantially across the shingle blank in a direction substantially perpendicular to the length of the shingle blank.

27. The shingle blank of claim 25 in which the perforations have a length of about 0.25 inches.

28. The shingle blank of claim 25 in which the perforations are spaced apart a distance of about 0.25 inches from edge to edge.

29. The shingle blank of claim 25 in which the web has a depth of approximately 0.03125 inches.

\* \* \* \* \*